US011046194B2

(12) United States Patent
Grassl et al.

(10) Patent No.: US 11,046,194 B2
(45) Date of Patent: Jun. 29, 2021

(54) COMPONENT OF AN INDUCTIVE ENERGY TRANSMISSION APPARATUS WITH OBJECT RECOGNITION AND METHOD FOR OPERATING AN INDUCTIVE ENERGY TRANSMISSION APPARATUS

(71) Applicant: AUDI AG, Ingolstadt (DE)

(72) Inventors: Tobias Grassl, Denkendorf (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 114 days.

(21) Appl. No.: 16/489,471

(22) PCT Filed: May 9, 2018

(86) PCT No.: PCT/EP2018/062061
§ 371 (c)(1),
(2) Date: Aug. 28, 2019

(87) PCT Pub. No.: WO2018/233926
PCT Pub. Date: Dec. 27, 2018

(65) Prior Publication Data
US 2019/0386526 A1     Dec. 19, 2019

(30) Foreign Application Priority Data

Jun. 21, 2017   (DE) .................... 10 2017 210 409.0

(51) Int. Cl.
*B60L 53/124*     (2019.01)
*H02J 50/60*      (2016.01)
(Continued)

(52) U.S. Cl.
CPC ............ *B60L 53/124* (2019.02); *H02J 50/10* (2016.02); *H02J 50/60* (2016.02); *H02J 50/90* (2016.02)

(58) Field of Classification Search
CPC .. H02J 50/60; B60L 53/12–126; B60L 53/34; B60L 53/38–39
See application file for complete search history.

(56) References Cited

U.S. PATENT DOCUMENTS

2010/0084918 A1 * 4/2010 Fells ..................... H02J 50/60
307/32
2013/0169062 A1   7/2013 Maikawa et al.
(Continued)

FOREIGN PATENT DOCUMENTS

DE   202009009693 U1   11/2010
DE   102009033237 A1   1/2011
(Continued)

OTHER PUBLICATIONS

English machine translation of JP2006230129A available Aug. 31, 2006. (Year: 2006).*
(Continued)

*Primary Examiner* — Rexford N Barnie
*Assistant Examiner* — David A Shiao
(74) *Attorney, Agent, or Firm* — Maier & Maier, PLLC

(57) ABSTRACT

The invention relates to a component of an inductive energy transmission apparatus, wherein the component includes an object recognition apparatus having at least a first and a second electrical inductance, wherein the first electrical inductance is formed by an energy transmission coil of the component, which can be acted upon by a predetermined measurement current, and the component comprises a measurement apparatus, an energy transmission unit and an evaluation apparatus.

14 Claims, 1 Drawing Sheet

(51) Int. Cl.
*H02J 50/10* (2016.01)
*H02J 50/90* (2016.01)

(56) References Cited

U.S. PATENT DOCUMENTS

| | | |
|---|---|---|
| 2015/0061580 A1 | 3/2015 | Yamakawa et al. |
| 2015/0188355 A1* | 7/2015 | Chuang .................. H02J 50/12 320/108 |
| 2015/0321567 A1* | 11/2015 | Czainski ............... B60L 53/122 191/10 |
| 2015/0323694 A1 | 11/2015 | Roy et al. |
| 2016/0006260 A1* | 1/2016 | Nakamura ............ B60L 53/126 307/104 |
| 2016/0016478 A1* | 1/2016 | Saito ....................... H01F 27/38 307/104 |
| 2016/0187519 A1* | 6/2016 | Widmer ................ B60L 3/0069 324/222 |
| 2017/0033609 A1* | 2/2017 | Nakamura .............. H02J 50/60 |
| 2017/0141622 A1 | 5/2017 | Meichle |
| 2019/0260234 A1* | 8/2019 | Schumann .............. H02J 50/12 |

FOREIGN PATENT DOCUMENTS

| | | |
|---|---|---|
| DE | 102012218194 A1 | 4/2014 |
| DE | 102013219678 A1 | 4/2015 |
| DE | 102014220224 A1 | 4/2016 |
| DE | 102015221587 A1 | 5/2017 |
| DE | 102015224013 A1 | 6/2017 |
| JP | 2006230129 A * | 8/2006 |
| WO | 2013/189530 A1 | 12/2013 |

OTHER PUBLICATIONS

International Preliminary Report on Patentability dated Dec. 26, 2019 in corresponding International Application No. PCT/EP2018/062061; 7 pages.
German Examination Report dated Apr. 17, 2018 in corresponding German Application No. 10 2017 210 409.0; 16 pages.
International Search Report and Written Opinion dated Aug. 21, 2018 in corresponding International Application No. PCT/EP2018/062061; 28 pages.

* cited by examiner

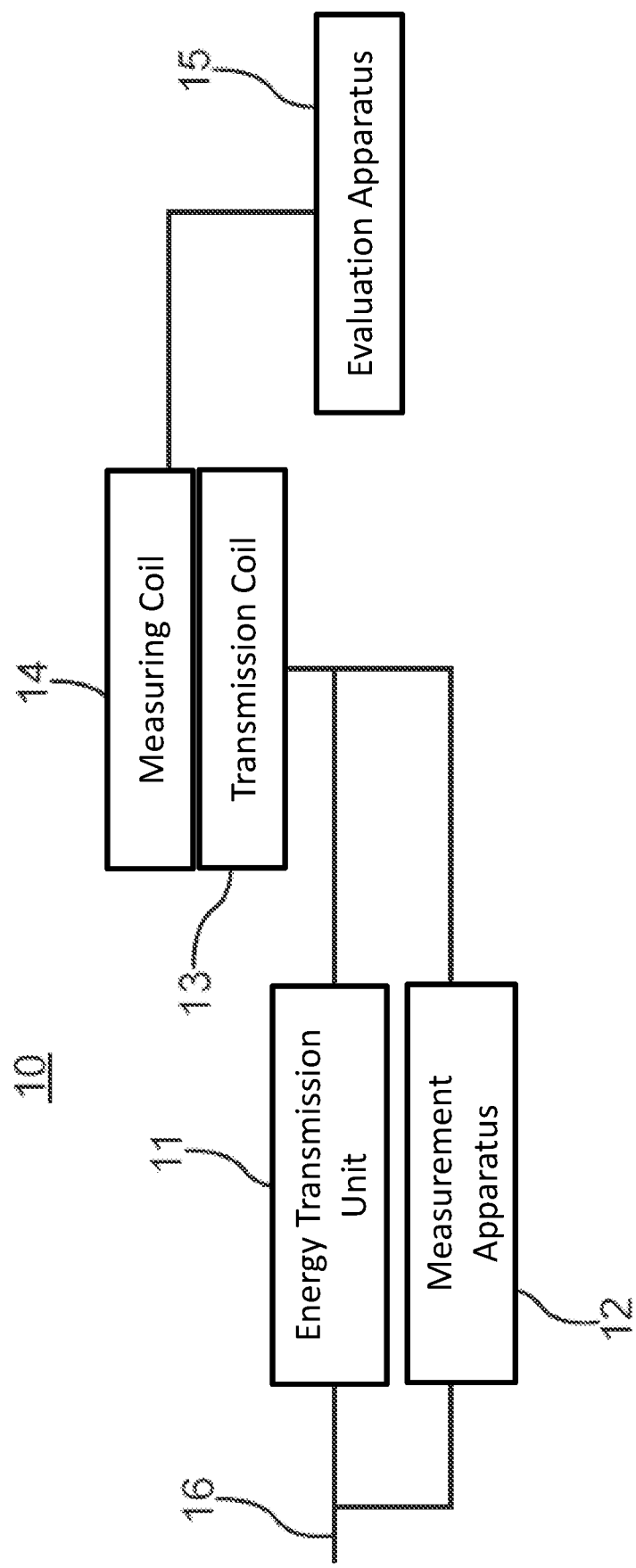

COMPONENT OF AN INDUCTIVE ENERGY TRANSMISSION APPARATUS WITH OBJECT RECOGNITION AND METHOD FOR OPERATING AN INDUCTIVE ENERGY TRANSMISSION APPARATUS

FIELD

The invention relates to a component of an inductive energy transmission apparatus having object recognition. The invention furthermore relates to a method for operating an inductive energy transmission apparatus with object recognition.

BACKGROUND

Components of inductive energy transmission apparatus with object or metal object recognition are known. Inductive energy transmission apparatus serve for transmitting energy from a stationary component, such as a fixed charging station, via a magnetic field of an energy transmission to a mobile component, which may be arranged in a motor vehicle, in order to charge a battery of the motor vehicle in this way. If a metal object, more precisely an electrically conductive object, is located between a coil or inductance of the stationary component and a coil or inductance of the mobile component, this represents a safety risk, since it may become strongly heated by the eddy currents induced by the magnetic field of the energy transmission. The object itself may become damaged or cause a fire. This is the case, for example, when the stationary component is provided in or on a road surface and the energy transmission occurs to a motor vehicle parked above it, while on the road beneath the motor vehicle there is found for example an aluminum can or a conductively coated paper. In order to avoid the safety risk, it is necessary for an energy transmission to occur only when no such objects are found in the magnetic field of the energy transmission. By an object that can be identified or detected by the object recognition apparatus is meant in the following a metal object or electrically conductive object. If such an object is identified or detected, the energy transmission can be prevented.

Apparatus for the detection or recognition of such objects or for minimizing the safety risk due to heated objects are known in inductive energy transmission apparatus.

From DE 20 2009 009 693 U1 there is known an apparatus for the inductive transfer of electrical energy from a stationary unit having at least one primary inductance to a vehicle. The apparatus has an apparatus for the detecting of the presence of an electrically conductive object. The primary inductance is used as a measuring inductance or measuring coil for the detection, and a plurality of separate measuring inductances may also be used. Each measuring coil is acted upon with a measurement current of predetermined strength. An electrically conductive object is detected in that the measuring field of the measuring coil generates eddy currents in the object, whose magnetic retroactive effect on the particular measuring coil brings about a change in the impedance of this measuring coil. The shortcoming here is that the measurement occurs with only one coil, namely, the primary coil, so that the accuracy of the detection is reduced, or a plurality of measuring coils needs to be actuated with measuring currents, requiring great complexity for the power electronics of the apparatus.

From DE 10 2014 220 224 A1 there is known a method for noncontact charging of a battery-operated object via a magnetically coupled pair of coils having a primary coil and a secondary coil. It is proposed that the magnetic field between the coils is as minimal as possible, since this results in a heating of metal objects which might be located between the coils by induced eddy currents. By the minimization of the magnetic field, the heating and thus the accompanying safety risk is lessened. The shortcoming here is that the battery-operated object is also charged when a metal object is located between the coils, so that it is still heated to a certain extent.

SUMMARY

The problem which the invention proposes to solve is to provide a component of an inductive energy transmission apparatus that comprises an apparatus for the detection of electrically conductive objects, with the apparatus being designed especially efficiently.

For this, it is provided that a component of an inductive energy transmission apparatus comprises object recognition or an object recognition apparatus. The object recognition apparatus comprises at least two electrical inductances. The first electrical inductance is formed by an energy transmission coil of the component, which may be a primary coil or a secondary coil, depending on the kind of component. The energy transmission coil thus also serves for transmitting power in an energy transmission to a further component of the inductive energy transmission apparatus. In the energy transmission coil, a magnetic transmission field is generated in one operating mode by a transmission current. In another operating mode, different from an energy transmission mode, the energy transmission coil is acted upon with a predetermined measurement current. This measurement current is designed to serve for an object recognition. The predetermined measurement current is chosen such that it is less than a transmission current for an energy transmission. For example, it amounts to only a few percent of the value of the transmission current.

The component comprises a measurement apparatus, an energy transmission unit and an evaluation apparatus. The energy transmission unit is for example electronics or power electronics by means of which a transmission current can be generated, which generates a magnetic field for the energy transmission in the energy transmission coil. The measurement apparatus is designed to generate the measurement current, which in particular is less than the transmission current. The advantage resulting from this is that on the one hand no additional coil is required for a magnetic field of the measurement apparatus by which an object can be recognized. On the other hand, the measurement apparatus ensures that a magnetic field has such low field strength that if an object is positioned in the magnetic field it does not become heated, since the eddy currents are too low for this. The measurement current can be adjusted such that all standards and limit values for magnetic fields emanating from an energy transmission are always fulfilled. Because the energy transmission coil can also be used to generate the magnetic field for the detection, the object recognition is very efficient and requires no additional coil to generate this magnetic field.

At least the second electrical inductance of the component is designed as a measuring coil. The measuring coil receives the magnetic field generated by the measurement current by the energy transmission coil. The measuring coil generates in dependence on this magnetic field a measurement signal and sends it to the evaluation apparatus or relays it on to the evaluation apparatus. The evaluation apparatus is designed to detect, in dependence on the measurement signal, whether an electrically conductive object is located in the magnetic field, i.e., in a predetermined region around the component. The predetermined region in the case of a horizontally lying component may be a region at a particular distance above or around the component. For this, the evaluation apparatus may for example compare a received measurement signal with a saved measurement signal, which was received during a calibration stage without the presence of an object. If the received measurement signal deviates from the stored measurement signal, it can recognize or detect that an object is present. The evaluation apparatus can also detect the presence of an object in that the measurement signal has a predetermined, object-dependent voltage. Furthermore, the evaluation apparatus is designed to put out in a signal whether or not an object is present.

The advantage of this is that, when an object is present, the signal can prevent an energy transmission. Thus, the energy transmission unit in this case does not generate any transmission current, so that no magnetic field is generated by which an object if present would become heated. The advantage of the measuring coil being formed by a second inductance, different from the first electrical inductance, is that an object can be recognized especially precisely in this way, since the measurement current does not have to flow through the measuring coil. For example, even very small objects can be reliably identified in this way. A measuring coil also affords the advantage that it does not need to be designed to be acted upon with a measurement current or transmission current, so that it is designed efficiently solely for the receiving of a magnetic field and therefore it is designed small and material-economizing.

The invention also relates to modifications of the component, by which further benefits are produced.

In one modification, the component comprises a plurality of measuring coils on its surface, the measuring coils being spatially distributed. The measuring coils can also be protected on the outside by a paneling. For example, the measuring coils may be arranged between the outer paneling and the energy transmission coil. The benefit of a spatial distribution of a plurality of measuring coils is that in this way a spatial position of an object can be identified. The measuring coils are each individually coupled to the evaluation apparatus and respectively send a corresponding measurement signal to the evaluation apparatus. When an object is located above one of the measuring coils, the measurement signal of this individual measuring coil differs from the signals of the other measuring coils. In this way, the evaluation apparatus identifies the position of the object and can also put out the position of the object in the signal. Especially in the case of small objects, this affords the benefit that the position of the object can be indicated for example to the driver of a motor vehicle and the driver can remove the object without having to search long for it.

In one modification of the component it is provided that the measurement apparatus generating the measurement current is provided independently of the energy transmission unit. This means that the components of the measurement apparatus are provided in addition to the components of the energy transmission unit. For example, both the energy transmission unit and the measurement apparatus are connected to the terminals of the energy transmission coil. The benefit of this is that an object recognition can also take place when the energy transmission unit is deactivated. The energy transmission unit only needs to be activated when the measurement apparatus and the evaluation apparatus have recognized that no object is present. The advantage of this is that energy does not need to be consumed needlessly by the energy transmission unit in this case. This increases the efficiency of the inductive energy transmission apparatus.

In one modification it is provided that the measurement apparatus and the energy transmission unit comprise at least one common element. For this purpose, the measurement apparatus may be integrated in a power electronics of the energy transmission unit. For example, the measurement apparatus can feed the measurement current across the same electrical connection to the energy transmission coil as the energy transmission unit. The benefit of this is that electrical components do not need to be provided needlessly in duplicate. With common passive elements such as resistors or coils that do not need to be activated, the advantage is that the measurement apparatus can even be active when an energy transmission unit is deactivated.

One modification calls for the common element of the measurement apparatus and the energy transmission unit to be an intermediate circuit capacitor. An intermediate circuit capacitor can have an intermediate circuit voltage which is suitable to being used by the energy transmission unit in order to generate from it the transmission current for the energy transmission coil. In this case, the measurement apparatus is designed to step down the intermediate circuit voltage, i.e., to reduce it. Because the intermediate circuit voltage is reduced by the measurement apparatus, it is ensured that the predetermined measurement current is not exceeded and thus the resulting field strength of the magnetic field of the measurement apparatus lies within a predetermined range of values. This range of values is one in which an electrically conductive subject would not become heated by the magnetic field, or only slightly heated.

One modification calls for a frequency of the magnetic field which is generated by the measurement apparatus through the measurement current is variably adjustable at least in a predetermined range of values. For this, the measurement apparatus comprises an inverter, for example, which can generate through a respective actuating signal an alternating voltage with different frequencies, which is present on the energy transmission coil and which produces the measurement current. The frequency of the magnetic field corresponds to the frequency of this generated alternating voltage. The benefit of this is that a frequency of the magnetic field of the measurement apparatus need not have the same frequency as the energy transmission unit. The frequency of the energy transmission unit is advantageously optimized for the most efficient possible energy transmission. The frequency of the measurement apparatus, on the other hand, may be advantageously optimized by this modification for the recognition of objects.

One modification of the component calls for the frequency of the measurement apparatus to be different from the frequency of the energy transmission unit. By this is meant that the energy transmission unit generates a magnetic field with a different frequency than the measurement apparatus. This provides in particular the benefit that even when power is already being transmitted and during the energy transmission an electrically conductive subject enters the magnetic field of the energy transmission, this can be recognized by the measurement apparatus without the magnetic field of the energy transmission unit disturbing the magnetic field of the measurement apparatus. It is also possible for an object recognition process to be organized such that multiple different frequencies are used in it. Thus, in a measurement process the measurement apparatus changes the frequency of the magnetic field once or more times in succession. The benefit of this is that different objects can be recognized especially well at different frequencies. Thus, by this modification it is ensured that electrically conductive objects of different kinds which are present can be identified especially reliably.

In one modification it is provided that the component is a stationary component of an inductive energy transmission apparatus or a mobile component of an energy transmission apparatus. A stationary component is provided for example at a fixed charging station at which motor vehicles outfitted with a mobile component can be charged.

In one modification of the component it is provided that the component is a stationary component and it has a vehicle proximity apparatus. The vehicle proximity apparatus is designed to signal the approaching of a vehicle or motor vehicle, which is driving up to the component for a charging process. For example, the vehicle proximity apparatus provides a WLAN receiver or a camera, wherein the WLAN receiver can identify a WLAN signal of the motor vehicle and the camera can optically identify the motor vehicle when it has come close to the component. The vehicle proximity apparatus is designed to signal to a control apparatus when a vehicle is approaching. The control apparatus can then already start an object recognition process when the vehicle has not yet reached a parked position for the energy transmission or a charging position with the component. Thus, the object recognition takes place when the two components of the inductive energy transmission apparatus are not yet situated opposite or coupled to each other. The benefit of this is that if an electrically conductive object is located on the stationary component, this can already be signaled to the driver of the motor vehicle before the driver has parked his motor vehicle over the object. In this way, the driver of the vehicle can remove the object already before parking the position of the motor vehicle on the stationary component and only then drive his motor vehicle onto the stationary component. Thus, the driver does not first need to drive the motor vehicle away from the stationary component in order to remove the object, which can save on time and energy.

The invention also relates to a method for operating an inductive energy transmission apparatus having an object recognition apparatus. This comprises at least a first and a second electrical inductance. An energy transmission coil is used as the first electrical inductance. The energy transmission coil is for example the primary coil provided at a stationary component. In the method, this is acted upon with a predetermined measurement current. The measurement current is generated by a measurement apparatus, which in particular is independent of a transmission apparatus feeding a charging current to the energy transmission coil, which is used to charge a motor vehicle, for example. Furthermore, at least the second electrical inductance receives the generated magnetic field and generates a corresponding measurement signal in dependence on this magnetic field. This measurement signal is sent to a selection of the apparatus, which sends a first signal to a control apparatus when an object is detected in a predetermined proximity to the inductive energy transmission apparatus. The predetermined proximity is determined in that an object within this predetermined proximity would become greatly heated by the magnetic field of the electrical energy transmission. The energy transmission is prevented if it is recognized by the evaluation apparatus through the measurement signal that an object is located within the predetermined proximity. This ensures that this object will not be heated by the magnetic field of the energy transmission and thus presents no risk.

BRIEF DESCRIPTION OF THE DRAWINGS

The FIGURE shows an exemplary schematic block diagram.

The invention also relates to modifications of the method according to the invention having features as were already described in connection with the modifications of the component according to the invention. For this reason, the corresponding modifications of the method according to the invention are not described here yet again.

In the following, exemplary embodiments of the invention are described. For this, the single FIGURE shows a component according to the invention in a representation of a schematic block diagram.

DETAILED DESCRIPTION

The exemplary embodiments explained below are preferred embodiments of the invention. In the exemplary embodiments the described components of the embodiments each represent individual features of the invention, independent of each other, which also modify the invention each time independently of each other and thus should also be considered as being part of the invention individually or in a combination other than what is illustrated. Furthermore, the described embodiments may also be amplified by other of the already described features of the invention.

The FIGURE shows a component 10 of an inductive energy transmission apparatus according to the invention. The component 10 comprises an energy transmission unit 11, a measurement apparatus 12, an energy transmission coil 13 and a measuring coil 14. The measuring coil 14 is coupled to an evaluation apparatus 15. In one exemplary embodiment, the component 10 is a stationary component, which is connected to a power supply grid 16. On the other hand, a mobile component may be connected to a battery.

In an energy transmission mode the component 10 can be coupled to a further component 10', so that energy can be transferred by means of inductive transfer between the components. In the stationary component 10, the energy transmission coil 13 here is a primary coil, while in a mobile component 10' the energy transmission coil 13 can be a secondary coil.

Prior to an energy transmission it must be assured that no electrically conductive object is present between the two coils, i.e., the primary coil and the secondary coil, for example. For such an object would be heated by the magnetic field of the energy transmission, so that it might catch fire and present a safety risk, for example. This may be the case with a cigarette pack having metal and paper. Therefore, the component 10 provides an object recognition. This is provided by the measurement apparatus 12, the energy transmission coil 13, the measuring coil 14 and the evaluation apparatus 15. Either a single measuring coil 14 or a plurality of measuring coils 14 may be provided. The measurement apparatus 12 generates a current, which is fed to the energy transmission coil 13 and thereby generates a magnetic field. This magnetic field is so slight that any electrically conductive object present will not be heated. For this, the measurement apparatus 12 is designed to generate a measurement current with a predetermined strength. This measurement current is less than a transmission current which can be generated by the energy transmission unit 11. An object in the predetermined region, i.e., in the magnetic field, will alter the magnetic field such that the measuring coil 14 when an object is present receives a different magnetic field than without such an object being present.

The measuring coil 14 generates a respective measurement signal, which is sent to the coupled evaluation apparatus 15. The evaluation apparatus is designed to detect the respective measurement signal and to interpret it and recognize whether or not an object is present. If an object is present, the evaluation apparatus 15 may put out a first signal; if no object is present, the evaluation apparatus may put out a second signal, for example.

If the second signal is put out, the energy transmission unit 11 may be activated, for example, so that an energy transmission to a mobile component may take place. If the first signal is put out, on the other hand, the energy transmission may be blocked, so that no safety risk is presented by an object which is present, since the object will not be heated.

The measurement apparatus 12 may generate a magnetic field with different frequencies. In a measurement process for the detecting of an object which might be present in a magnetic field of an energy transmission, multiple different frequencies may be used. This has the benefit that perturbations may be filtered out from the measurement or detection and the result becomes more precise. Thus, it is possible to recognize even small objects or objects of different kind.

In another exemplary embodiment, the measurement apparatus 12 is integrated in the energy transmission unit 11, so that certain electrical components of both the measurement apparatus 12 and the energy transmission unit 11 can be used. This might be, for example, an intermediate circuit capacitor. While the energy transmission unit 11 picks off a voltage from this intermediate circuit capacitor and generates a high-frequency signal for the energy transmission by an inverter, the measurement apparatus 12 at first steps down the intermediate circuit voltage of the intermediate circuit capacitor. This means that the intermediate circuit voltage can be stepped down for example to 10% of its original value. In this way, it is ensured that the measurement current does not exceed a predetermined value and thus a magnetic field which is used for the object recognition will only reach field strengths which do not heat an object or only heat it by a few degrees, so that no safety risk is presented by this object.

Thanks to the invention, a system for inductive energy transmission having only a single coil to which a current is fed is enlarged by a separate small electronic unit. This small electronic unit or auxiliary electronic unit or measurement apparatus generates a current and thus a magnetic field in the primary coils of the inductive energy transmission apparatus in a detection process. It is also possible to adapt an intermediate circuit voltage with the aid of an upstream power grid input to ensure low voltages at the input of an inverter and thus assure low field strengths. The benefit of this is that no further large-area coils need to be installed, thanks to the use of the coils of the inductive energy transmission system. This reduces the design space and the overall costs. In particular, during an object recognition prior to a parking process, i.e., when the vehicle is not yet parked at a stationary component in order to begin an energy transmission, it is possible to carry out the object recognition and at the same time maintain required limit values for the electrical and/or magnetic field.

On the whole, the examples show how a component of an inductive energy transmission apparatus having only a single inductance to which a current is fed will provide an efficient and accurate object recognition.

The invention claimed is:

1. An inductive energy transmission apparatus comprising:
    an object recognition apparatus, a measurement apparatus, an energy transmission unit, and an evaluation apparatus,
    wherein the object recognition apparatus has at least a first electrical inductance configured as an energy transmission coil and a second electrical inductance configured as a measuring coil,
    wherein the measurement apparatus is configured to output a measurement current to the energy transmission coil, and the energy transmission unit is configured to output a transmission current to the energy transmission coil,
    wherein a magnetic field generated in the energy transmission coil in response to the measurement current has less field strength than a magnetic field generated in the energy transmission coil in response to the transmission current,
    wherein the evaluation apparatus is coupled to the measuring coil and is configured to output a signal when the presence of an electrically conductive object from a measurement signal of the measuring coil is recognized,
    wherein the measurement apparatus is integrated in the energy transmission unit and shares at least one common element with the energy transmission unit,
    wherein the at least one common element comprises an intermediate circuit capacitor, and
    wherein the measurement apparatus steps down an intermediate circuit voltage to output the predetermined measurement current,
    wherein the magnetic field generated in the energy transmission coil in response to the measurement current is generated at a measurement frequency which is variably adjustable in a predetermined range of values,
    wherein the magnetic field generated in the energy transmission coil in response to the transmission current is generated at a transmission frequency which is different from the measurement frequency,
    wherein the magnetic field generated in the energy transmission coil in response to the measurement current is generated simultaneously with the magnetic field generated in the energy transmission coil in response to the transmission current.

2. The inductive energy transmission apparatus according to claim 1, wherein a plurality of measuring coils is provided spatially distributed on a surface of the inductive energy transmission apparatus and the evaluation apparatus is coupled to the plurality of measuring coils and is configured to recognize a spatial position of the electrically conductive object.

3. The inductive energy transmission apparatus according to claim 2, wherein the measurement apparatus generating the measurement current is provided with measurement electronics independent of the energy transmission unit.

4. The inductive energy transmission apparatus according to claim 2, wherein the inductive energy transmission apparatus is a stationary or a mobile component.

5. The inductive energy transmission apparatus according to claim 2, wherein the inductive energy transmission apparatus is a stationary component further comprising a vehicle proximity apparatus and a control apparatus,
    wherein the vehicle proximity apparatus of the inductive energy transmission apparatus is configured to detect an approach of a vehicle, and wherein the control apparatus, in response to the approach of the vehicle, is configured to carry out an object recognition process before the vehicle is in a charging position over the inductive energy transmission apparatus.

6. The inductive energy transmission apparatus according to claim 1, wherein the measurement apparatus generating the measurement current is provided with measurement electronics independent of the energy transmission unit.

7. The inductive energy transmission apparatus according to claim 6, wherein the inductive energy transmission apparatus is a stationary or a mobile component.

8. The inductive energy transmission apparatus according to claim 6, wherein the inductive energy transmission apparatus is a stationary component further comprising a vehicle proximity apparatus and a control apparatus,
wherein the vehicle proximity apparatus of the inductive energy transmission apparatus is configured to detect an approach of a vehicle, and
wherein the control apparatus, in response to the approach of the vehicle, is configured to carry out an object recognition process before the vehicle is in a charging position over the inductive energy transmission apparatus.

9. The inductive energy transmission apparatus according to claim 1, wherein the measurement frequency is varied in succession during an object recognition process.

10. The inductive energy transmission apparatus according to claim 9, wherein the inductive energy transmission apparatus is a stationary or a mobile component.

11. The inductive energy transmission apparatus according to claim 9, wherein the inductive energy transmission apparatus is a stationary component further comprising a vehicle proximity apparatus and a control apparatus,
wherein the vehicle proximity apparatus of the inductive energy transmission apparatus is configured detect an approach of a vehicle, and
wherein the control apparatus, in response to the approach of the vehicle, is configured to carry out an object recognition process before the vehicle is in a charging position over the inductive energy transmission apparatus.

12. The inductive energy transmission apparatus according to claim 1, wherein the inductive energy transmission apparatus is a stationary or a mobile component.

13. The inductive energy transmission apparatus according to claim 1, wherein the inductive energy transmission apparatus is a stationary component further comprising a vehicle proximity apparatus and a control apparatus,
wherein the vehicle proximity apparatus is configured to detect an approach of a vehicle, and
wherein the control apparatus, in response to the approach of the vehicle, is configured to carry out an object recognition process via the object recognition apparatus before the vehicle is in a charging position over the inductive energy transmission apparatus.

14. A method for operating an inductive energy transmission apparatus having an object recognition apparatus, a measurement apparatus, an energy transmission unit, an evaluation apparatus, and a control apparatus, comprising the steps of:
provision of the object recognition apparatus with at least a first electrical inductance configured as an energy transmission coil and a second electrical inductance configured as a measuring coil,
output of a predetermined measurement current by the measurement apparatus to the transmission coil in order to generate a magnetic field in response to the measurement current,
output of a transmission current by the energy transmission unit to the transmission coil in order to generate a magnetic field in response to the transmission current,
receiving, by the measuring coil the magnetic field generated in response to the measurement current, and generating and transmitting a measurement signal in response,
evaluating, by the evaluation apparatus, the measurement signal such that, when an electrically conductive object is detected in a predetermined proximity to the inductive energy transmission apparatus, a first signal is transmitted to the control apparatus,
prevention, by the control apparatus, of an energy transmission upon receipt of the first signal,
wherein the magnetic field generated in response to the measurement current has less field strength than the magnetic field generated in response to the transmission current,
wherein the measurement apparatus is integrated in the energy transmission unit and shares at least one common element with the energy transmission unit,
wherein the at least one common element comprises an intermediate circuit capacitor,
wherein the measurement apparatus steps down an intermediate circuit voltage to output the predetermined measurement current,
wherein the magnetic field generated in response to the measurement current is generated at a measurement frequency which is variably adjustable in a predetermined range of values,
wherein the magnetic field generated in response to the transmission current is generated at a transmission frequency which is different from the measurement frequency,
wherein the magnetic field generated in response to the measurement current is generated simultaneously with the magnetic field generated in response to the transmission current.

* * * * *